US006917190B2

United States Patent
Matsuo et al.

(10) Patent No.: US 6,917,190 B2
(45) Date of Patent: Jul. 12, 2005

(54) POWER SUPPLY APPARATUS VARYING AN OUTPUT CONSTANT VOLTAGE IN RESPONSE TO A CONTROL SIGNAL FROM A LOAD CIRCUIT

(75) Inventors: Masahiro Matsuo, Hyogo-ken (JP); Shoichi Nitta, Osaka (JP); Ritsuko Nomura, Osaka (JP)

(73) Assignee: Ricoh Company, Ltd. (JP)

( * ) Notice: Subject to any disclaimer, the term of this patent is extended or adjusted under 35 U.S.C. 154(b) by 49 days.

(21) Appl. No.: 10/603,853

(22) Filed: Jun. 26, 2003

(65) Prior Publication Data
US 2004/0051509 A1 Mar. 18, 2004

(30) Foreign Application Priority Data

Jul. 4, 2002 (JP) .......................................... 2002-195406
Aug. 28, 2002 (JP) .......................................... 2002-249081

(51) Int. Cl.[7] .............................................. G05F 1/40
(52) U.S. Cl. .......................................... 323/287; 323/354
(58) Field of Search ................................. 323/287, 367, 323/354, 369

(56) References Cited

U.S. PATENT DOCUMENTS

| 4,810,948 A | * | 3/1989 | Takuma ...................... 323/280 |
| 6,115,292 A | | 9/2000 | Fukuda et al. |
| 6,335,883 B1 | | 1/2002 | Fukuda et al. |
| 6,504,350 B2 | * | 1/2003 | Leonowich .................. 323/281 |
| 6,545,916 B2 | | 4/2003 | Fukuda et al. |

* cited by examiner

*Primary Examiner*—Shawn Riley
(74) *Attorney, Agent, or Firm*—Dickstein Shapiro Morin & Oshinsky LLP

(57) ABSTRACT

A power supply apparatus includes an output voltage generator, a reference voltage generator, a voltage divider, and a voltage control circuit. An input voltage is supplied from a direct current power source. The output voltage generator generates a constant output voltage based on the input voltage. The reference voltage generator generates a reference voltage. The voltage divider divides the constant output voltage into a divided voltage in accordance with a voltage dividing ratio variable in response to an externally-input control signal. The voltage control circuit controls the output voltage generator to regulate the constant output voltage such that the divided voltage from the voltage divider is equalized to the reference voltage.

26 Claims, 10 Drawing Sheets

US 6,917,190 B2

POWER SUPPLY APPARATUS VARYING AN OUTPUT CONSTANT VOLTAGE IN RESPONSE TO A CONTROL SIGNAL FROM A LOAD CIRCUIT

CROSS-REFERENCE TO RELATED APPLICATIONS

This application claims priority under 35 USC §119 to Japanese patent application No. JPAP 2002-195406 filed Jul. 4, 2002, and Japanese patent application No. JPAP 2002-249081, filed Aug. 28, 2002, the entire contents of which are incorporated herein by reference.

FIELD OF THE INVENTION

The present invention relates to a power supply apparatus, and more particularly to a power supply apparatus capable of varying an output constant voltage in response to a control signal from a load circuit.

BACKGROUND OF THE INVENTION

Conventional power supply apparatus use a switching or series regulator on a power supply side for outputting a predetermined voltage required by a load side. As shown in FIG. 1, a background power supply apparatus 100 has a feedback configuration to return an output voltage Vo of a DC-to-DC converter, to divide the output voltage Vo with a voltage divider 101 into a divided voltage Vd, and to compare the divided voltage Vd with a predetermined reference voltage Vr.

Due to a recent trend, however, the voltage required by the load side has been reduced, and the power supply apparatus is consequently required to change the output voltage of the switching or series regulator. Also, the power supply apparatus itself needs to be changed when a required power supply voltage value is changed by, for example, the replacement of a component used in the load side of a system after the power supply apparatus is installed into the system.

In view of the foregoing, it is desirable to change a level of an output constant voltage in response to a control signal sent from a load side.

SUMMARY OF THE INVENTION

In one example, a novel power supply apparatus includes an input terminal, an output voltage generator, an output terminal, a reference voltage generator, a voltage divider, and a voltage control circuit. The input terminal is supplied with an input voltage from a direct current power source. The output voltage generator is configured to generate a constant output voltage based on the input voltage. The output terminal outputs the constant output voltage. The reference voltage generator is configured to generate a reference voltage. The voltage divider has an output and is configured to divide the constant output voltage into a divided voltage output from the output in accordance with a voltage dividing ratio variable in response to an externally-input control signal. The voltage control circuit is configured to control the output voltage generator to regulate the constant output voltage such that the divided voltage from the voltage divider is equalized to the reference voltage.

The voltage divider may include a first resistor circuit, a first switch circuit, a second resistor circuit, a second switch circuit, and a switch control circuit. The first resistor circuit includes a plurality of resistors connected in series between the output terminal and the output point of the voltage divider. The first switch circuit is configured to make a short circuit in at least one of the plurality of resistors included in the first resistor circuit in response to an input control signal. The second resistor circuit includes a plurality of resistors. The second switch circuit is configured to connect in parallel at least one of the plurality of resistors included in the second resistor circuit between the output point of the voltage divider and a common ground of the direct current power source in response to the input control signal. The switch control circuit is configured to generate the input control signal in response to the externally-input control signal and to control the first and second switch circuits with the input control signal to change the voltage dividing ratio.

The voltage divider may include a first resistor circuit, a first switch circuit, a second resistor circuit, a second switch circuit, and a switch control circuit. The first resistor circuit includes a plurality of resistors. The first switch circuit is configured to connect in parallel at least one of the plurality of resistors included in the first resistor circuit between the output terminal and the output point of the voltage divider in response to an input control signal. The second resistor circuit includes a plurality of resistors connected in series between the output point of the voltage divider and a common ground of the direct current power source. The second switch circuit is configured to make a short circuit in at least one of the plurality of resistors included in the second resistor circuit in response to the input control signal. The switch control circuit is configured to generate the input control signal in response to the externally-input control signal and to control the first and second switch circuits with the input control signal to change the voltage dividing ratio.

The output voltage generator may include a switching transistor performing a switching operation for outputting the input voltage applied by the direct current power source in accordance with a control signal from the voltage control circuit, and the voltage control circuit may include an error amplifier, a control circuit, and a smoothing circuit. The error amplifier amplifies an error of the divided voltage output from the output point of the voltage divider relative to the reference voltage. The control circuit is configured to generate the control signal in accordance with an output signal from the error amplifier to control the switching operation of the switching transistor. The smoothing circuit is configured to smooth an output signal from the switching transistor and to output to the output terminal.

The reference voltage generator, the voltage divider, the error amplifier, and the control circuit may be integrated into a single integrated circuit.

The reference voltage generator, the switching transistor, the voltage divider, the error amplifier, and the control circuit may be integrated into a single integrated circuit.

The smoothing circuit may include a transistor which is operated and controlled by the control circuit to function as a flywheel diode, and the transistor, the switching transistor, the voltage divider, the error amplifier, the smoothing transistor and the control circuit may be integrated into a single integrated circuit.

The output voltage generator may include an output control transistor controlling an output of a current applied by the direct current power source in accordance with a control signal from the voltage control circuit, and the voltage control circuit may include an error amplifier controlling an operation of the output control transistor such that the divided voltage of the voltage divider is equalized to the reference voltage.

The reference voltage generator, the voltage divider, and the error amplifier may be integrated into a single integrated circuit.

The reference voltage generator, the voltage divider, the error amplifier, and the output control transistor may be integrated into a single integrated circuit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
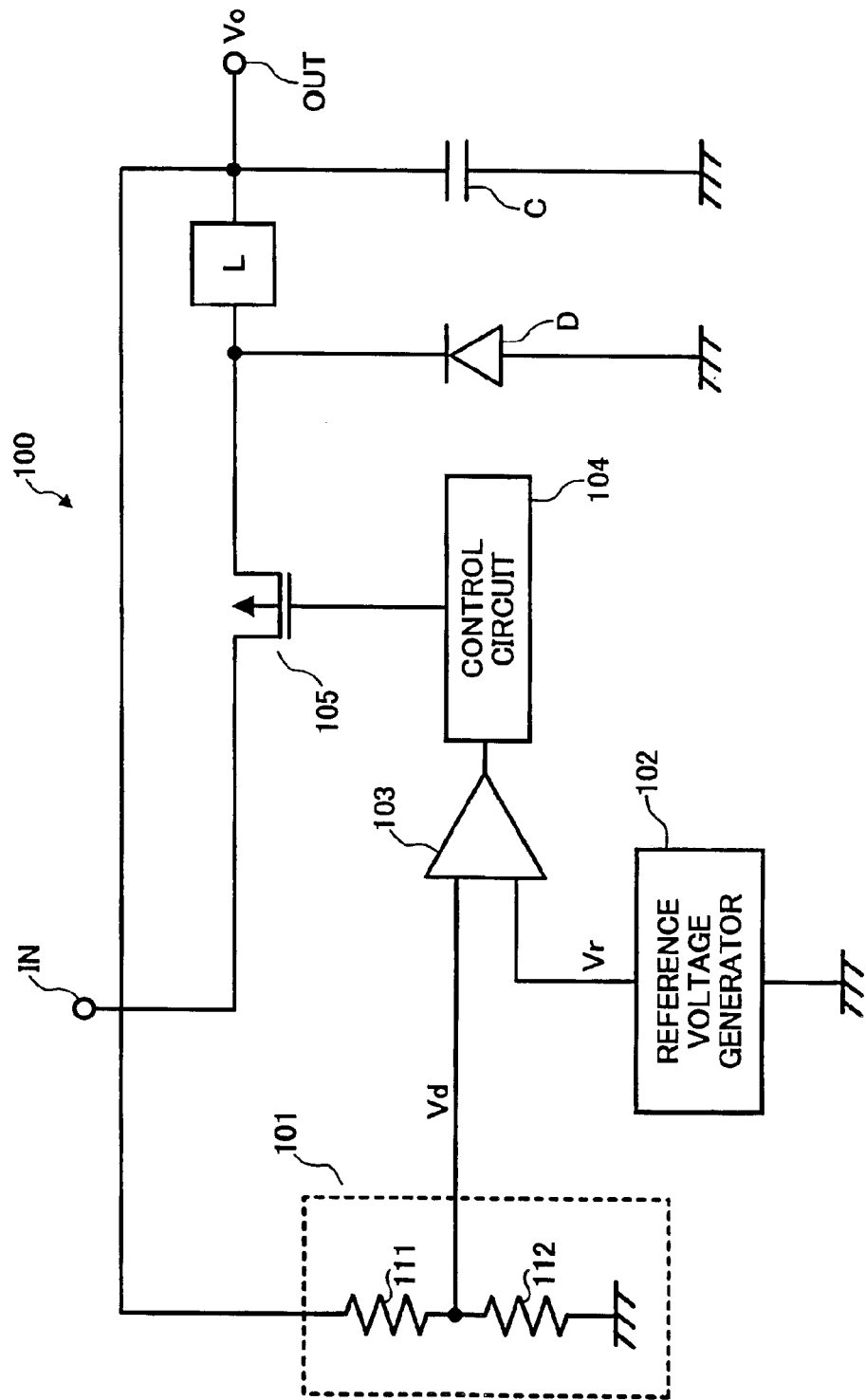
FIG. 1 is a circuit diagram of a conventional power supply apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a power supply apparatus 1 according to a preferred embodiment of the present invention is explained. The power supply apparatus 1 of FIG. 2 is an exemplary power supply apparatus provided with a DC-to-DC (direct current to direct current) converter including a voltage-step-down-type switching regulator.

Figure 2:
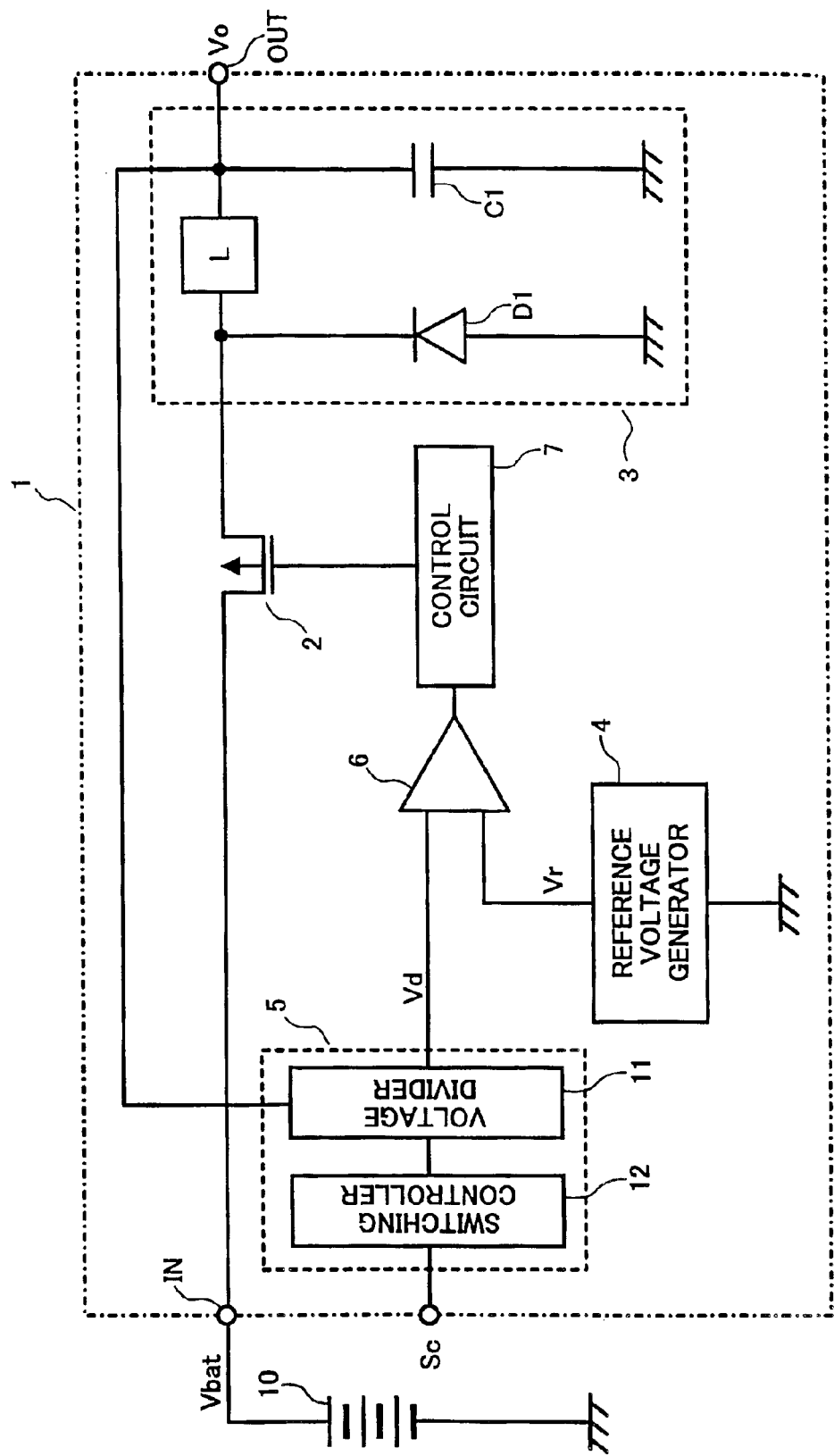
FIG. 2 is an exemplary circuit diagram of a power supply apparatus according to a preferred embodiment of the present invention.

As shown in FIG. 2, the power supply apparatus 1 is connected to a direct current power source 10, and includes a switching transistor 2, a smoothing circuit 3, a reference voltage generator 4, a voltage dividing circuit 5, an error amplifier 6, and a control circuit 7. The current power source 10 includes a battery and the like and applies a voltage Vbat to the switching transistor 2 through an input terminal IN of the power supply apparatus 1. The switching transistor 2 includes a P-channel MOS (metal oxide semiconductor) transistor (hereinafter referred to as a PMOS transistor) which outputs the voltage Vbat applied thereto by the direct current power source 10. The smoothing circuit 3 smoothes the signal output from the switching transistor 2 and outputs the signal having a voltage Vo to an output terminal OUT. The reference voltage generator 4 generates a reference voltage Vr having a predetermined voltage value. The voltage dividing circuit 5 divides the voltage Vo and outputs a divided voltage Vd. The error amplifier 6 amplifies an error of the divided voltage Vd relative to the reference voltage Vr. The control circuit 7 controls the switching of the switching transistor 2 in accordance with the signal output from the error amplifier 6.

The output voltage Vo is divided by the voltage dividing circuit 5, and the difference between the resultant divided voltage Vd, which is regarded as an error, is amplified by the error amplifier 6. The control circuit 7 includes an oscillator for generating, for example, a pulse signal having a triangular waveform and a comparator. In the control circuit 7, the comparator compares the voltage of the signal output from the oscillator with the voltage of the signal output from the error amplifier 6. In accordance with a result of the comparison, the comparator controls a time that the switching transistor 2 is being turned on. The signal output from the switching transistor 2 is smoothed and output as the voltage Vo, by the smoothing circuit 3 which includes a flywheel diode D1, an electric coil L1, and a capacitor C1.

The voltage dividing circuit 5 includes a voltage divider 11 and a switching controller 12. The voltage divider 11 switches a dividing ratio in accordance with an input control signal, and accordingly generates and outputs the divided voltage Vd. The switching controller 12 controls the switching of the dividing ratio of the voltage divider 11 in accordance with a voltage switching signal Sc which is externally input thereto.

Figure 3:
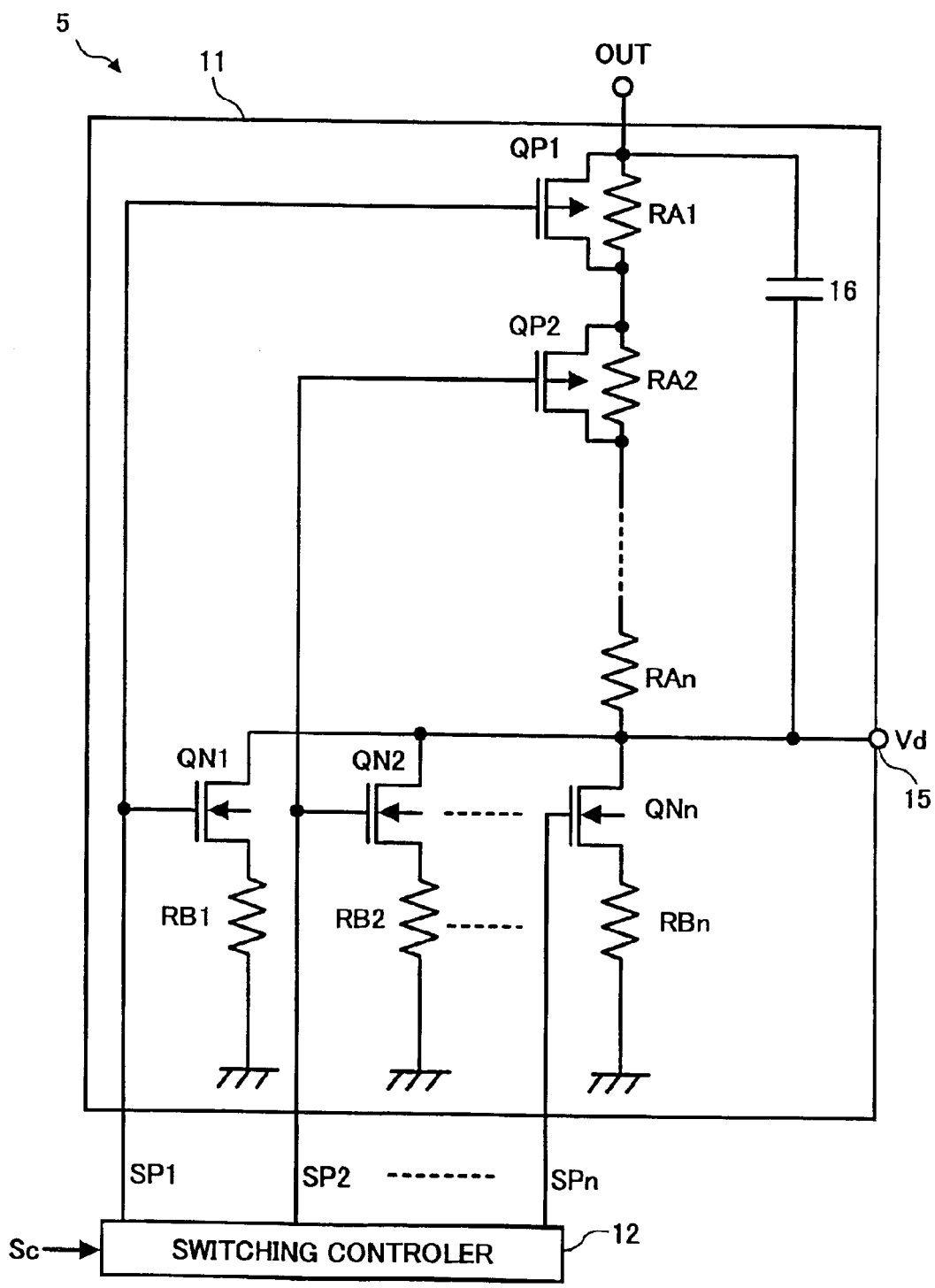
FIG. 3 is an exemplary circuit diagram of a voltage dividing circuit included in the power supply apparatus of FIG. 2.

FIG. 3 breaks down the voltage divider 11 of the voltage dividing circuit 5, and an exemplary operation of the voltage dividing circuit 5 is explained with reference to FIG. 3. The voltage divider 11 includes n resistors in series referred to as resistors RA1–RAn, n resistors referred to as resistors RB1–RBn, (n−1) PMOS transistors referred to as PMOS transistors QP1–QPn−1, n N-channel MOS transistors referred to as NMOS transistors QN1–QNn, and a capacitor 16. The resistors RA1–RAn are configured as a first resistor circuit, the resistors RB1–RBn are configured as a second resistor circuit, the PMOS transistors QP1–QPn−1 are configured as a first switching circuit, and the NMOS transistors QN1–QNn are configured as a second switching circuit.

The resistors RA1–RAn are connected in series between the terminal OUT of the power supply apparatus 1 and the output terminal 15. The PMOS transistors QP1–QPn are coupled to the resistors RA1–RAn, respectively, to form n sets of transistor-resistor parallel circuits, which are connected in series between the output terminal 15 and a ground. The switching controller 12 generates control signals SP1–SPn based on the voltage switching signal Sc, and applies the control signals SP1–SPn−1 to gates of the PMOS transistors QP1–QPn−1, respectively.

A capacitor 16 is also connected between the terminal OUT of the power supply apparatus 1 and the output terminal 15. The NMOS transistors QN1–QNn are coupled to the resistors RB1–RBn, respectively, to form n sets of transistor-resistor series circuits, which are connected in parallel between the output terminal 15 and a ground. The control signals SP1–SPn of the switching controller 12 are also applied to gates of the PMOS transistors QN1–QNn, respectively.

The switching controller 12 raises one of the control signals SP1–SPn to a predetermined high level (hereinafter referred to as a level H) and drops the rest down to a predetermined low level (hereinafter referred to as a level L) in accordance with the externally supplied input voltage switching signal Sc. For example, when the control signal SPm is raised to the level H and the rest of the control signals are lowered to the level L, the PMOS transistor QPm is selected among the PMOS transistors QP1–QPn-1 to be turned off to become non-conductive and the rest of the PMOS transistors are turned on to be conductive, where m is an integer between 1 and n-1. At the same time, the NMOS transistor QNm is selected among the NMOS transistors QN1–QNn to be turned on to be conductive and the rest of the NMOS transistors are turned off to become non-conductive. Thereby, the resistors RAm and RAn are connected in series between the output terminal OUT and the output terminal 15, and the resistor RBm is connected between the output terminal 15 and the ground.

When the above-described conditions are established, the divided voltage Vd is expressed by a first equation; $Vd=(Vo \times RBm)/(RAm+RAn+RBm)$, where RAm, RBm, and RAn represent values of the resistors RAm, RBm, and RAn, respectively.

The input voltages to the inverse and non-inverse input terminals of the error amplifier 6, which are Vd and Vr, respectively, are equalized due to a phenomenon called an imaginary short occurring therebetween. That is, in this case, a relationship between Vd and Vr is expressed as $Vd=Vr$. Therefore, the above first equation can be modified as; $Vo=Vr \times (RAm+RAn+RBm)/RBm$.

For another example, when the control signal SPn is raised to the level H and the control signals SP1–SPn-1 are lowered to the level L, the PMOS transistors QP1–QPn-1 are turned on to be conductive. At the same time, the NMOS transistor QNn is turned on to be conductive and the rest of the NMOS transistors QN1–QNn-1 are turned off to be non-conductive. Thereby, the resistor RAn is connected between the output terminal OUT and the output terminal 15, and the resistor RBn is connected between the output terminal 15 and the ground.

Under the above-mentioned conditions, the divided voltage Vd is expressed by a second equation; $Vd=(Vo \times RBn)/(RAn+RBn)$, where RBn represents a value of the resistor RBn.

The input voltages to the inverse and non-inverse input terminals of the error amplifier 6, which are Vd and Vr, respectively, are equalized due to the imaginary short phenomenon occurring therebetween. That is, in this case, a relationship between Vd and Vr is expressed as $Vd=Vr$. Therefore, the above second equation can be modified as; $Vo=Vr \times (RAn+RBn)/RBn$.

In this way, the voltage divider 11 can vary the value of the output voltage Vo in accordance with the voltage switching signal Sc. In other words, a desirable value of the output voltage Vo can be obtained from the voltage divider 11 by suitably selecting the voltage switching signal Sc.

Figure 4:
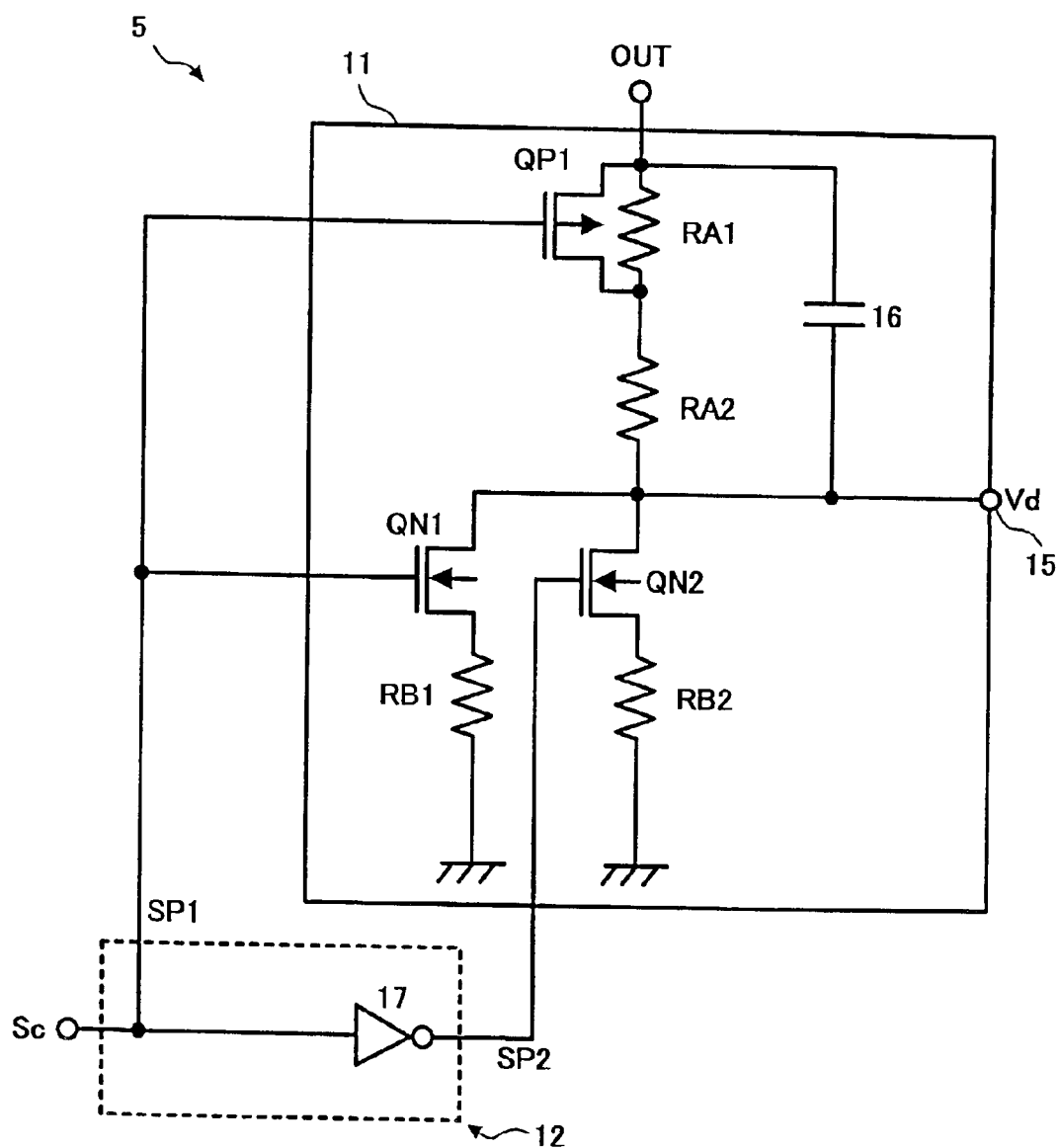
FIG. 4 is an exemplary circuit diagram of the voltage dividing circuit when in FIG. 3 is two.

FIG. 4 shows an exemplary circuit of the voltage dividing circuit 5 when n is two. In the voltage dividing circuit 5 of FIG. 4, the resistors RA1 and RA2 are connected in series between the output terminal OUT and the output terminal 15. The PMOS transistor QP1 is connected parallel to the resistor RA1 and the capacitor 16 is connected between the output terminal OUT and the output terminal 15.

Further, in the voltage dividing circuit 5 of FIG. 4, the NMOS transistors QN1 and QN2 are coupled to the resistors RB1 and RB2, respectively, to form two sets of transistor-resistor series circuits, which are connected in parallel between the output terminal 15 and the ground. The switching controller 12 includes an inverter 17, and generates the control signals SP1 and SP2 based on the voltage switching signal Sc. The control signal SP1 is a straight signal of the voltage switching signal Sc and the control signal SP2 is an inverted signal of the voltage switching signal Sc. The control signal SP1 is applied to the gates of the PMOS transistor QP1 and the NMOS transistor QN1, and the control signal SP2 is applied to the gate of the NMOS transistor QN2.

In the voltage dividing circuit 5 of FIG. 4, the output voltage Vo based on the above modified first equation can be expressed as; $Vo=Vr \times (RA1+RA2+RB1)/RB1$.

Also, in the voltage dividing circuit 5 of FIG. 4, the output voltage Vo based on the above modified second equation can be expressed as; $Vo=Vr \times (RA2+RB2)/RB2$.

In the power supply apparatus 1 of FIG. 2, the reference voltage generator 4, the voltage dividing circuit 5, the error amplifier 6, and the control circuit 7 are integrated into one IC (integrated circuit) chip. It is possible to further integrate the switching transistor 2 into that IC chip.

Figure 5:
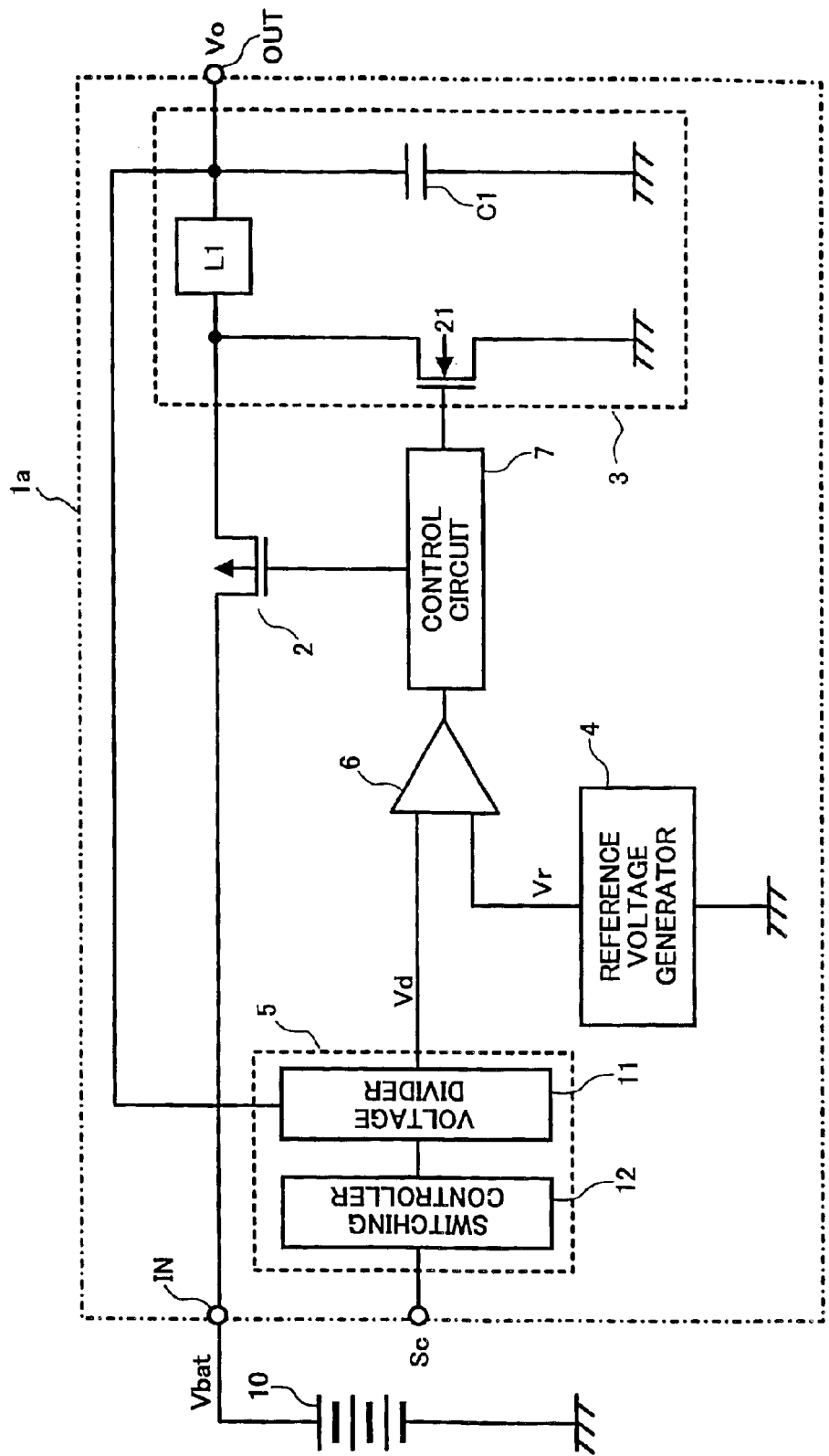
FIG. 5 is an exemplary circuit diagram of a power supply apparatus according to another preferred embodiment of the present invention.

It is also possible to substitute an NMOS transistor for the flywheel diode D1. FIG. 5 shows a power supply apparatus 1a, which is a first exemplary alternative embodiment based on the power supply apparatus 1 of FIG. 2, in which the flywheel diode D1 is substituted by an NMOS transistor 21. In this case, it becomes possible to integrate the switching transistor 2, the reference voltage generator 4, the voltage dividing circuit 5, the error amplifier 6, the control circuit 7, and the NMOS transistor 21 into one IC (integrated circuit) chip.

Figure 6:
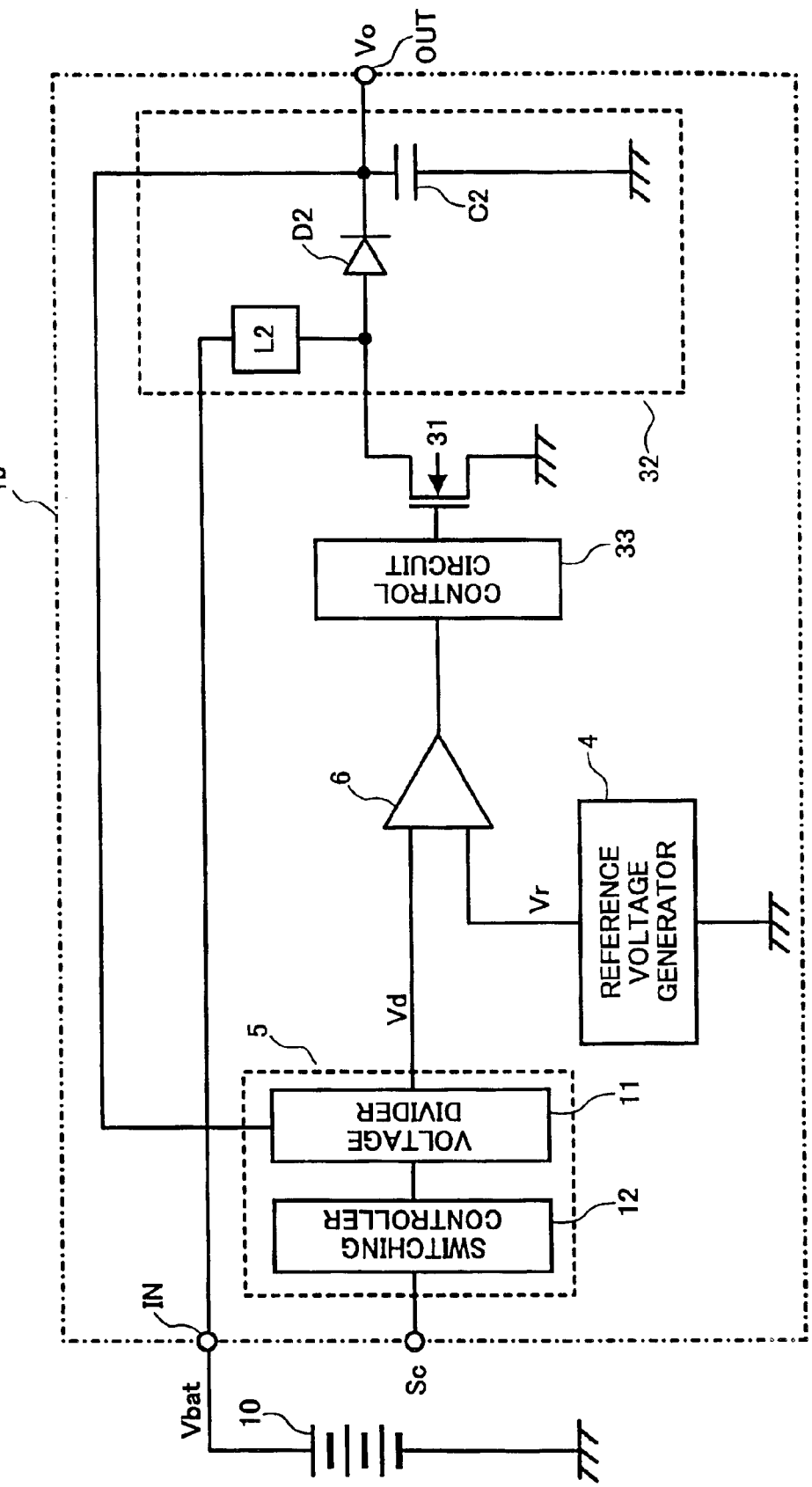
FIG. 6 is an exemplary circuit diagram of a power supply apparatus according to another preferred embodiment of the present invention.

FIG. 6 shows a power supply apparatus 1b, which is a second exemplary alternative embodiment based on the power supply apparatus 1 of FIG. 2. The power supply apparatus 1b of FIG. 6 is an exemplary power supply apparatus provided with a DC-to-DC (direct current to direct current) converter including a voltage-step-up-type switching regulator.

The power supply apparatus 1b of FIG. 6 is similar to the power supply apparatus 1 of FIG. 2, except for a switching regulator 31, a smoothing circuit 32, and a control circuit 33. The switching regulator 31 includes an NMOS transistor and performs a switching operation in accordance with a control signal input to a gate thereof. The smoothing circuit 32 smoothes the signal output from the switching transistor 31 and outputs a resultant signal having an output voltage Vo to the output terminal OUT. The control circuit 33 controls the switching operation of the switching transistor 31 in accordance with the signal output from the error amplifier 6.

The output voltage Vo output to the output terminal OUT is divided by the voltage dividing circuit 5, and the difference between the resultant divided voltage Vd, which is regarded as an error, is amplified by the error amplifier 6. The control circuit 33 includes an oscillator for generating, for example, a pulse signal having a triangular waveform and a comparator. In the control circuit 33, the comparator compares the voltage of the signal output from the oscillator with the voltage of the signal output from the error amplifier 6. In accordance with a result of the comparison, the comparator controls a time that the switching transistor 31 is being turned on. The signal output from the switching transistor 31 is smoothed and output as the voltage Vo, by the smoothing circuit 32, which includes a rectifying diode D2, an electric coil L2, and a capacitor C2.

In the power supply apparatus 1b of FIG. 6, the reference voltage generator 4, the voltage dividing circuit 5, the error amplifier 6, and the control circuit 33 are integrated into one IC (integrated circuit) chip. It is possible to further integrate the switching transistor 31 into that IC chip.

Figure 7:
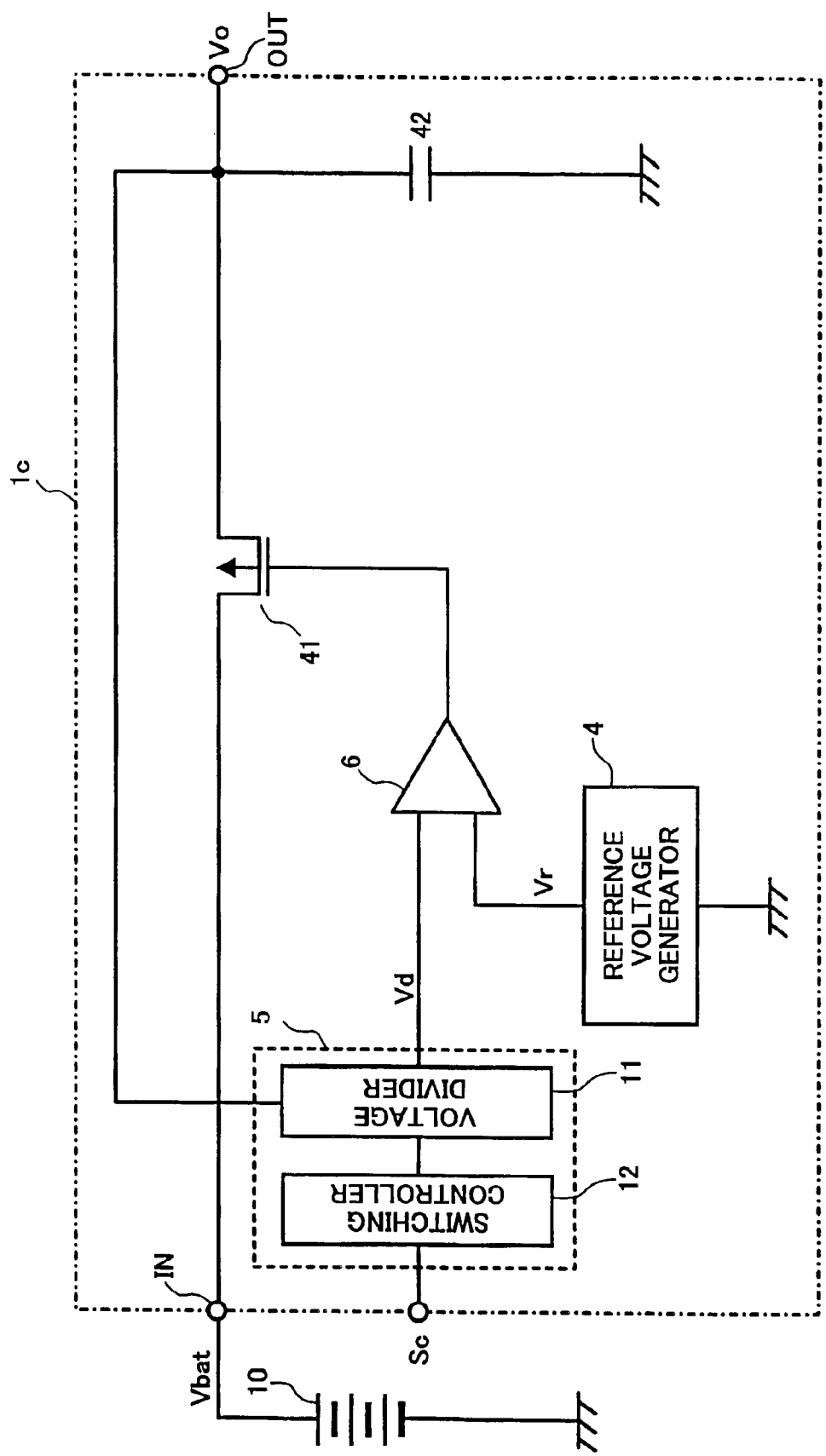
FIG. 7 is an exemplary circuit diagram of a power supply apparatus according to another preferred embodiment of the present invention.

FIG. 7 shows a power supply apparatus 1c, which is a third exemplary alternative embodiment based on the power supply apparatus 1 of FIG. 2. The power supply apparatus 1c of FIG. 7 is an exemplary power supply apparatus provided with a DC-to-DC (direct current to direct current) converter including a series regulator instead of a switching regulator.

The power supply apparatus 1c of FIG. 7 is similar to the power supply apparatus 1 of FIG. 2, except for an output control transistor 41 and a capacitor 42. The output control transistor 41 includes a PMOS transistor and outputs to the output terminal OUT a current in accordance with a voltage input to a gate thereof from the error amplifier 6. The capacitor 42 stabilizes an output voltage Vo output through the output terminal OUT.

The output voltage Vo output to the output terminal OUT is divided by the voltage dividing circuit 5, and the difference between the resultant divided voltage Vd, which is regarded as an error, is amplified by the error amplifier 6. The error amplifier 6 outputs a resultant voltage to a gate of the output control transistor 41. The error amplifier 6 thus controls the operation of the output control transistor 41 so as to regulate the output voltage Vo to a predetermined preferable voltage.

In the power supply apparatus 1c of FIG. 7, the reference voltage generator 4, the voltage dividing circuit 5, and the error amplifier 6 are integrated into one IC (integrated circuit) chip. It is possible to further integrate the output control transistor 41 into that IC chip.

In the case of the power supply apparatus 1 of FIG. 1, the switching controller 12 of the voltage dividing circuit 5 is configured to cause one of the PMOS transistors QP1–QPn–1 to turn exclusively off or every one of the PMOS transistors QP1–QPn–1 to turn on and one of the NMOS transistors QN1–QNn to turn exclusively on, in accordance with the externally input voltage switching signal Sc, as one example. This setting of the switching controller 12 in the power supply apparatus 1 can also be applied to the switching controller 12 of the power supply apparatus 1c, as one example.

As one exemplary alternative, in the power supply apparatus 1c, the switching controller 12 of the voltage dividing circuit 5 may cause more than one of the PMOS transistors QP1–QPn–1 to turn off simultaneously and more than one of the NMOS transistors QN1–QNn to turn on simultaneously, in accordance with the externally input voltage switching signal Sc.

As another exemplary alternative, in the power supply apparatus 1c, the switching controller 12 of the voltage dividing circuit 5 may cause one of the PMOS transistors QP1–QPn–1 to turn exclusively on or every one of the PMOS transistors QP1–QPn–1 to turn off and one of the NMOS transistors QN1–QNn to turn exclusively off, in accordance with the externally input voltage switching signal Sc.

As described above, in each power supply apparatus 1, 1a, 1b, and 1c, the voltage dividing circuit 5 is configured to have a feedback circuit for dividing the output voltage Vo to generate the divided voltage Vd. This voltage dividing circuit 5 is further configured to change the voltage dividing ratio relative to the output voltage Vo in accordance with the voltage switching signal Sc to change consequently the divided voltage Vd. Thereby, the voltage value of the output voltage Vo is changed in a preferable manner. In other words, each power supply apparatus 1, 1a, 1b, and 1c has the structure capable of allowing an external selection of the output voltage Vo from a plurality of predetermined voltage values. Therefore, any one power supply apparatus 1, 1a, 1b, and 1c can comply with a change in the power requirements of the load circuit by easily changing the output voltage value without the needs of changing the power supply apparatus itself.

In addition, in any one power supply apparatus 1, 1a 1b, and 1c, each of the resistors RB1–RBn coupled to the NMOS transistors QN1–QNn, respectively, is turned into conductive status when corresponding one of the NMOS transistors QN1–QNn is turned off into non-conductive status. That is, a parasitic capacitor of each resistor can be disregarded in the status that the NMOS transistor is out of conduction. This status facilitates a phase design of the voltage dividing circuit 5.

Figure 8:
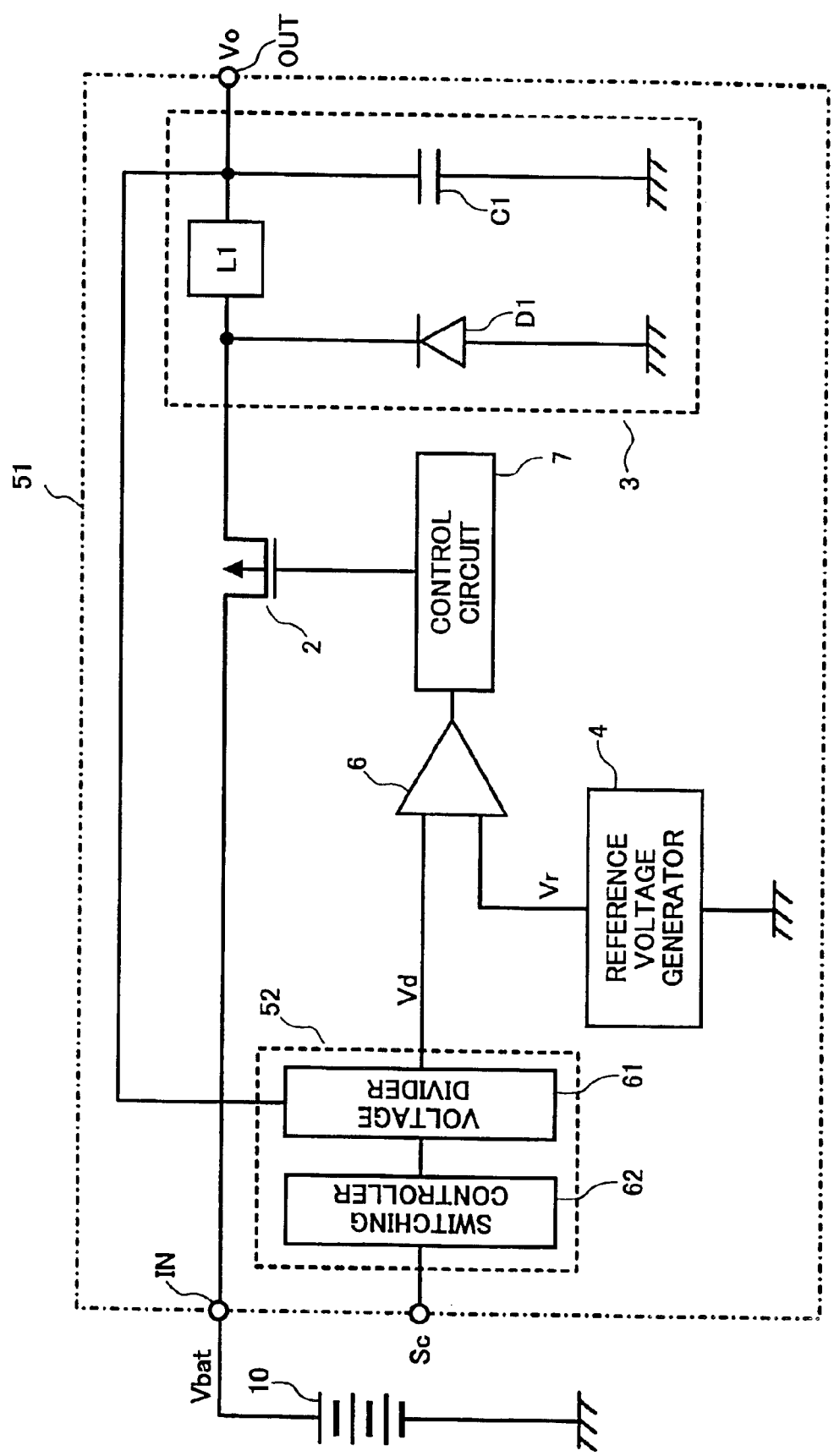
FIG. 8 is an exemplary circuit diagram of a power supply apparatus according to another preferred embodiment of the present invention.

Referring to FIG. 8, a power supply apparatus 51 according to another preferred embodiment of the present invention is explained. FIG. 8 shows the power supply apparatus 51 which is similar to the power supply apparatus 1 of FIG. 2, having a DC-to-DC (direct current to direct current) converter including a voltage-step-down-type switching regulator, except for a voltage dividing circuit 52. As shown in FIG. 8, the power supply apparatus 51 is connected to the direct current power source 10, and includes the switching transistor 2, the smoothing circuit 3, the reference voltage generator 4, the voltage dividing circuit 52, the error amplifier 6, and the control circuit 7.

The voltage dividing circuit 52 includes a voltage divider 61 and a switching controller 62. The voltage divider 61 switches a dividing ratio in accordance with an input control signal, and accordingly generates and outputs the divided voltage Vd. The switching controller 62 controls the switching of the dividing ratio of the voltage divider 61 in accordance with a voltage switching signal Sc which is externally input thereto.

Figure 9:
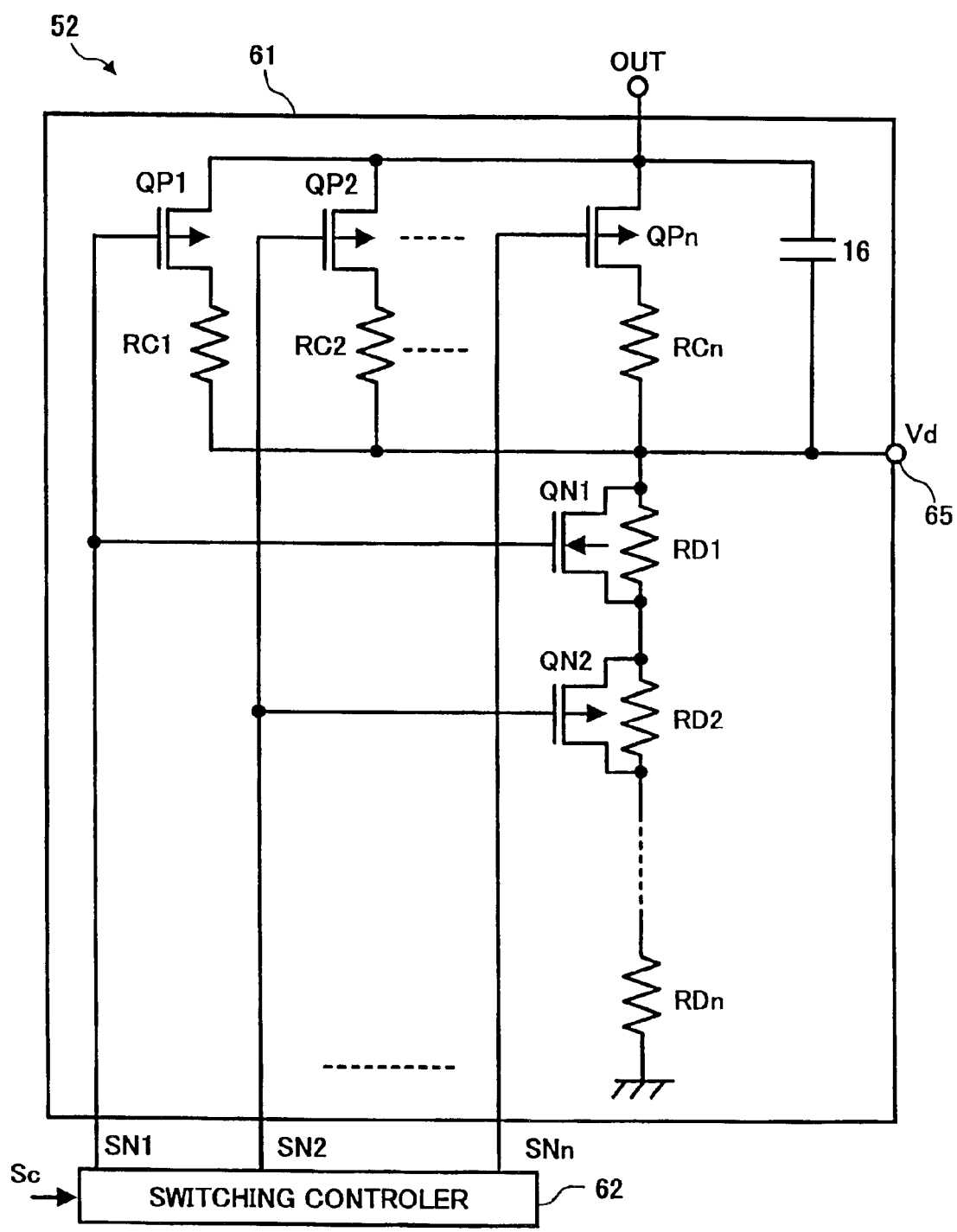
FIG. 9 is an exemplary circuit diagram of a voltage dividing circuit included in the power supply apparatus of FIG. 7.

FIG. 9 breaks down the voltage divider 61 of the voltage dividing circuit 52 and, with reference thereto, an exemplary operation of the voltage dividing circuit 52 is explained. The voltage divider 61 includes n resistors referred to as resistors RC1–RCn, n resistors in series referred to as resistors RD1–RDn, n PMOS transistors referred to as PMOS transistors QP1–QPn, (n–1) N-channel MOS transistors referred to as NMOS transistors QN1–QNn–1, and a capacitor 16. The resistors RC1–RCn are configured as a first resistor circuit, the resistors RD1–RDn are configured as a second resistor circuit, the PMOS transistors QP1–QPn are configured as a first switching circuit, and the NMOS transistors QN1–QNn–1 are configured as a second switching circuit.

The resistors RD1–RDn are connected in series between an output terminal 65 of the voltage dividing circuit 61 and the ground. The NMOS transistors QN1–QNn–1 are coupled to the resistors RD1–RDn–1, respectively, to form n–1 sets of transistor-resistors parallel circuits, which are connected in series between the output terminal 65 and the ground. The switching controller 62 generates control signals SN1–SNn based on the voltage switching signal Sc, and applies the control signals SN1–SNn–1 to gates of the NMOS transistors QN1–QNn–1, respectively.

The capacitor 16 is also connected between the output terminal OUT of the power supply apparatus 51 and the output terminal 65. The PMOS transistors QP1–QPn are coupled to the resistors RC1–RCn, respectively, to form n sets of transistor-resistor series circuits, which are connected in parallel between the output terminal OUT of the power supply apparatus 51 and the ground. The control signals SN1–SNn of the switching controller 62 are also applied to gates of the PMOS transistors QP1–QPn, respectively.

The switching controller 62 drops one of the control signals SN1–SNn down to the level L and raises the rest of the control signals to the level H in accordance with the externally input voltage switching signal Sc. For example, when the control signal SNm is dropped down to the level L and the rest of the control signals are raised to the level H, the PMOS transistor QPm is selected among the PMOS transistors QP1–QPn to be turned on to be conductive and the rest of the PMOS transistors are turned on to be non-conductive, where m is an integer between 1 and n–1. At the same time, the NMOS transistor QNm is selected among the NMOS transistors QN1–QNn–1 to be turned off to be non-conductive and the rest of the NMOS transistors are turned on to be conductive. Thereby, the resistor RCm is connected between the output terminal OUT and the output terminal 65, and the resistors RDm and RDn are connected in series between the output terminal 65 and the ground.

When the above-described conditions are established, the divided voltage Vd is expressed by a third equation; Vd=Vo×(RDm+RDn)/(RCm+RDm+RDn), where RCm, RDm, and RDn represent values of the resistors RCm, RDm, and RDn, respectively.

The input voltages to the inverse and non-inverse input terminals of the error amplifier 6, which are Vd and Vr, respectively, are equalized due to the imaginary short phenomenon occurring therebetween. That is, in this case, a relationship between Vd and Vr is expressed as Vd=Vr. Therefore, the above third equation can be modified as;

$$Vo=Vr \times (RCm+RDm+RDn)/(RDm+RDn).$$

As another example, when the control signal SNn is dropped down to the level L and the control signals SN1–SNn–1 are raised to the level H, the PMOS transistors QP1–QPn–1 are turned off to be non-conductive. At the same time, the PMOS transistor QPn is turned on to be conductive and the NMOS transistors QN1–QNn–1 are turned on to be conductive. Thereby, the resistor RCn is connected between the output terminal OUT and the output terminal 65, and the resistor RDn is connected between the output terminal 65 and the ground.

Under the above-mentioned conditions, the divided voltage Vd is expressed by a fourth equation; Vd=(Vo×RDn)/(RCn+RDn), where RCn represents a value of the resistor RCn.

The input voltages to the inverse and non-inverse input terminals of the error amplifier 6, which are Vd and Vr, respectively, are equalized due to the imaginary short phenomenon occurring therebetween. That is, in this case, a relationship between Vd and Vr is expressed as Vd=Vr. Therefore, the above fourth equation can be modified as; Vo=Vr×(RCn+RDn)/RDn.

In this way, the voltage divider 51 can vary the value of the output voltage Vo in accordance with the voltage switching signal Sc. In other words, a desirable value of the output voltage Vo can be obtained from the voltage divider 51 by suitably selecting the voltage switching signal Sc.

Figure 10:
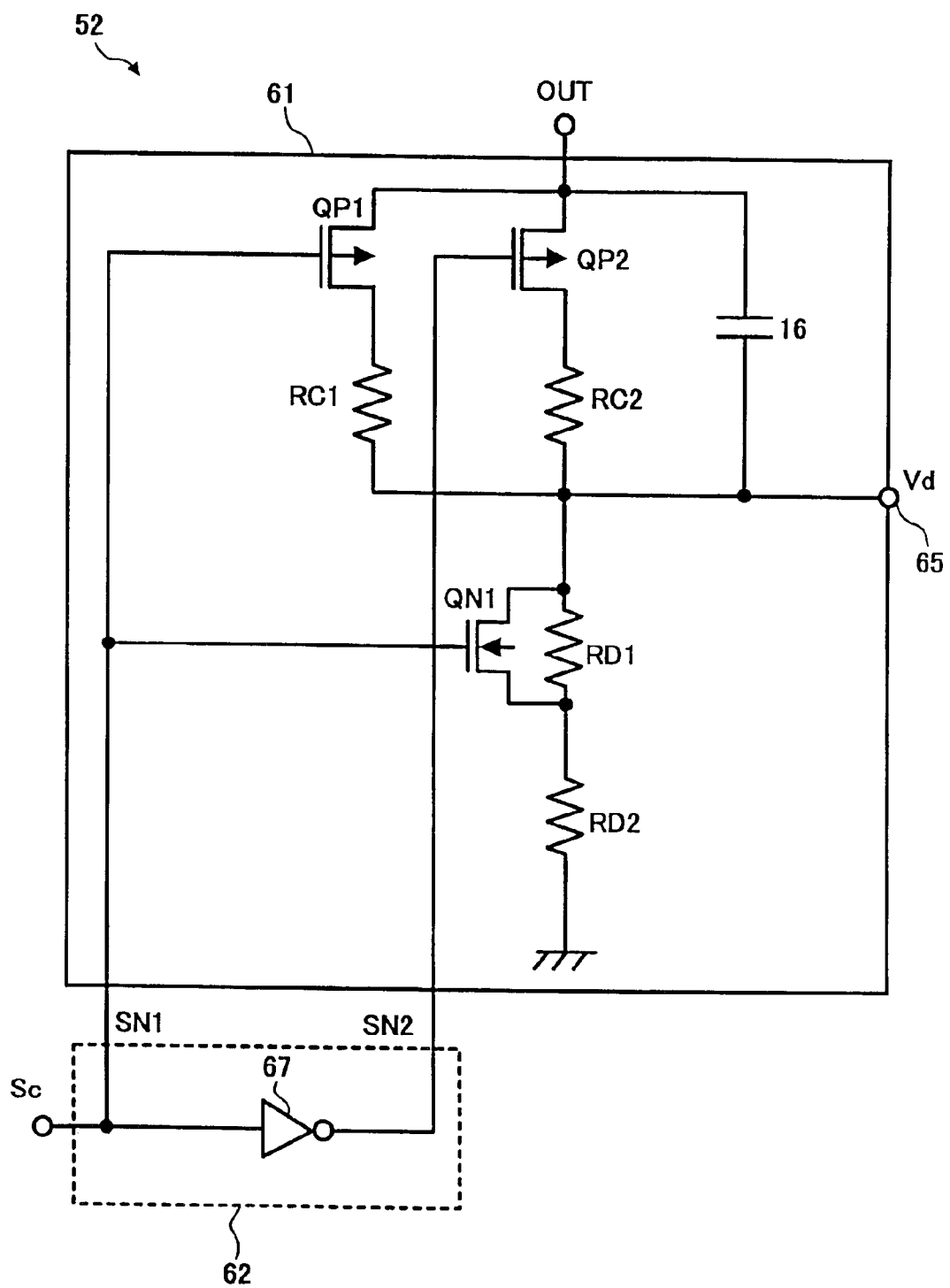
FIG. 10 is an exemplary circuit diagram of the voltage dividing circuit when in FIG. 9 is two.

FIG. 10 shows an exemplary circuit of the voltage dividing circuit 52 when n is two. In the voltage dividing circuit 52 of FIG. 10, the PMOS transistors QP1 and QP2 are coupled to the resistors RC1 and RC2, respectively, to form two pieces of transistor-resistor series circuits which are connected in parallel between the output terminal OUT and the output terminal 65. Also, the capacitor 16 is connected between the output terminal OUT and the output terminal 65.

Further, the resistors RD1 and RD2 are connected between the output terminal 65 and the ground, and the NMOS transistor QN1 is coupled to the resistor RD1 to form a transistor-resistor series circuit which is connected in series to the resistor RD2 between the output terminal 65 and the ground. The switching controller 62 includes an inverter 67, and generates the control signals SN1 and SN2 based on the voltage switching signal Sc. The control signal SN1 is a straight signal of the voltage switching signal Sc as it is and the control signal SN2 is an inverted signal of the voltage switching signal Sc. The control signal SN1 is applied to the gates of the PMOS transistor QP1 and the NMOS transistor QN1, and the control signal SN2 is applied to the gate of the PMOS transistor QP2.

In the voltage dividing circuit 52 of FIG. 10, the output voltage Vo based on the above modified third equation can be expressed as;

$$Vo=Vr \times (RC1+RD1+RD2)/(RD1+RD2).$$

Also, the above modified fourth equation can be expressed as;

$$Vo=Vr \times (RC2+RD2)/RD2.$$

In the power supply apparatus 1 of FIG. 8, the reference voltage generator 4, the voltage dividing circuit 52, the error amplifier 6, and the control circuit 7 are integrated into one IC (integrated circuit) chip. It is possible to further integrate the switching transistor 2 into that IC chip.

It is also possible to substitute an NMOS transistor for the flywheel diode D1. FIG. 5 shows a power supply apparatus 1a which is a first modified version based on the power supply apparatus 1 of FIG. 2, in which the flywheel diode D1 is substituted by an NMOS transistor, as in the case of FIG. 5. In this case, it becomes possible to integrate the switching transistor 2, the reference voltage generator 4, the voltage dividing circuit 52, the error amplifier 6, the control circuit 7, and the NMOS transistor into one IC (integrated circuit) chip.

To use a DC-to-DC (direct current to direct current) converter including a voltage-step-up-type switching regulator as an alternative to the DC-to-DC converter including the voltage-step-down-type switching regulator, the power supply apparatus 51 of FIG. 8 may become the one similar to the power supply apparatus 1b shown in FIG. 6, except that the voltage dividing circuit 5 is replaced with the voltage dividing circuit 52. In such a power supply apparatus, the reference voltage generator 4, the voltage dividing circuit 52, the error amplifier 6, and the control circuit 33 can be integrated into one IC (integrated circuit) chip. It is also possible to further integrate the switching transistor 31 into that IC chip.

Further, to use a series regulator instead of a switching regulator, the power supply apparatus 51 of FIG. 8 may become the one similar to the power supply apparatus 1c shown in FIG. 7, except that the voltage dividing circuit 5 is replaced with the voltage dividing circuit 52. In such a power supply apparatus, the reference voltage generator 4, the voltage dividing circuit 52, and the error amplifier 6 can be integrated into one IC (integrated circuit) chip. It is also possible to further integrate the output control transistor 41 into that IC chip.

In the power supply apparatus 51 of FIG. 8, the switching controller 62 of the voltage dividing circuit 52 causes one of the PMOS transistors QP1–QPn to turn exclusively on and one of the NMOS transistors QN1–QNn-1 to turn exclusively off or every one of the NMOS transistors QN1–QNn-1 to turn on, in accordance with the externally input voltage switching signal Sc, as one example.

As an alternative, the switching controller 62 may cause more than one of the PMOS transistors QP1–QPn to turn on simultaneously and more than one of the NMOS transistors QN1–QNn-1 to turn off simultaneously, in accordance with the externally input voltage switching signal Sc.

As another alternative, the switching controller 12 may cause one of the PMOS transistors QP1–QPn to turn exclusively off and one of the NMOS transistors QN1–QNn-1 to turn exclusively on or every one of the NMOS transistors QN1–QNn-1 to turn off, in accordance with the externally input voltage switching signal Sc.

As described above, in the power supply apparatus 51, the voltage dividing circuit 52 is configured to have a feedback circuit for dividing the output voltage Vo to generate the divided voltage Vd. This voltage dividing circuit 52 is further configured to change the voltage dividing ratio relative to the output voltage Vo in accordance with the voltage switching signal Sc to change consequently the divided voltage Vd. Thereby, the voltage value of the output voltage Vo is changed in a preferable manner. In other words, each one of the power supply apparatus 51 has the structure capable of allowing an external selection of the output voltage Vo from a plurality of predetermined voltage values. Therefore, the power supply apparatus 51 can comply with a change in the power requirements of the load circuit by easily changing the output voltage value without the needs of changing the power supply apparatus itself.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A power supply apparatus, comprising:
    an input terminal having an input voltage applied thereto from a direct current power source;
    an output voltage generator configured to generate a constant output voltage based on said input voltage;
    an output terminal of said output voltage generator outputting said constant output voltage;
    a reference voltage generator configured to generate a reference voltage;
    a voltage divider having an output point, said voltage divider configured to accept said constant output voltage from said output terminal of said output voltage generator and further configured to divide said constant output voltage into a divided voltage in accordance with a voltage dividing ratio which is variable in response to an externally-input control signal and to output said divided voltage to said output point of said voltage divider, wherein said voltage divider comprises a first resistance circuit including a plurality of resistors connectable in series, and a second resistance circuit connected in series with said first resistance circuit, said second resistance circuit including a plurality of resistors connectable in parallel including at least one switchably controllable resistor; and
    a voltage control circuit configured to control said output voltage generator to regulate said constant output voltage such that said divided voltage from said voltage divider is equalized to said reference voltage.

2. The power supply apparatus as defined in claim 1, wherein:
    said first resistance circuit is connected in series between said output terminal and said output point of said voltage divider;
    a first switch circuit configured to make a short circuit in at least one of said plurality of resistors included in said first resistance circuit in response to an input control signal;
    a second switch circuit configured to connect at least one of said plurality of resistors included in said second resistance circuit between said output point of said voltage divider and a common ground of said direct current power source in response to said input control signal; and
    a switch control circuit configured to generate said input control signal in response to said externally-input control signal and to control said first and second switch circuits with said input control signal to change the voltage dividing ratio.

3. The power supply apparatus as defined in claim 1, wherein said voltage divider further comprises:
    a first switch circuit configured to connect in parallel with at least one of said plurality of resistors included in said second resistance circuit between said output terminal and said output point of said voltage divider in response to an input control signal; and wherein
    said first resistance circuit is connected in series between said output point of said voltage divider and a common ground of said direct current power source;
    a second switch circuit configured to make a short circuit in at least one of said plurality of resistors included in said first resistance circuit in response to said input control signal; and
    a switch control circuit configured to generate said input control signal in response to said externally-input control signal and to control said first and second switch circuits with said input control signal to change the voltage dividing ratio.

4. The power supply apparatus as defined in claim 1, wherein said output voltage generator includes a switching transistor performing a switching operation for outputting the input voltage applied by the direct current power source in accordance with a control signal from said voltage control circuit, wherein said voltage control circuit comprises:
    an error amplifier amplifying an error of said divided voltage output from said output point of said voltage divider relative to said reference voltage;
    a control circuit configured to generate said control signal in accordance with an output signal from said error amplifier to control said switching operation of said switching transistor; and
    a smoothing circuit configured to smooth an output signal from said switching transistor and to output said smoothed output signal to said output terminal.

5. The power supply apparatus as defined in claim 4, wherein said reference voltage generator, said voltage divider, said error amplifier, and said control circuit are integrated into a single integrated circuit.

6. The power supply apparatus as defined in claim 4, wherein said reference voltage generator, said switching transistor, said voltage divider, said error amplifier, and said control circuit are integrated into a single integrated circuit.

7. A power supply apparatus, comprising:
- an input terminal having an input voltage applied thereto from a direct current power source;
- an output voltage generator configured to generate a constant output voltage based on said input voltage;
- an output terminal of said output voltage generator outputting said constant output voltage;
- a reference voltage generator configured to generate a reference voltage;
- a voltage divider having an output point, said voltage divider configured to accept said constant output voltage from said output terminal of said output voltage generator and further configured to divide said constant output voltage into a divided voltage in accordance with a voltage dividing ratio which is variable in response to an externally-input control signal and to output said divided voltage to said output point of said voltage divider;
- a voltage control circuit configured to control said output voltage generator to regulate said constant output voltage such that said divided voltage from said voltage divider is equalized to said reference voltage;
- said output voltage generator includes a switching transistor performing a switching operation for outputting the input voltage applied by the direct current power source in accordance with a control signal from said voltage control circuit, wherein said voltage control circuit comprises:
  - an error amplifier amplifying an error of said divided voltage output from said output point of said voltage divider relative to said reference voltage,
  - a control circuit configured to generate said control signal in accordance with an output signal from said error amplifier to control said switching operation of said switching transistor, and
  - a smoothing circuit configured to smooth an output signal from said switching transistor and to output said smoothed output signal to said output terminal;
- said reference voltage generator, said voltage divider, said error amplifier, and said control circuit are integrated into a single integrated circuit;
- said reference voltage generator, said switching transistor, said voltage divider, said error amplifier, and said control circuit are integrated into a single integrated circuit; and
- wherein said smoothing circuit includes a transistor which is operated and controlled by said control circuit to function as a flywheel diode, and said transistor, said switching transistor, said voltage divider, said switching transistor, said error amplifier, and said control circuit are integrated into a single integrated circuit.

8. The power supply apparatus as defined in claim 1, wherein said output voltage generator includes an output control transistor controlling an output of a current applied by the direct current power source in accordance with a control signal from said voltage control circuit, wherein said voltage control circuit comprises an error amplifier controlling an operation of said output control transistor such that said divided voltage of said voltage divider is equalized to said reference voltage.

9. The power supply apparatus as defined in claim 8, wherein said reference voltage generator, said voltage divider, and said error amplifier are integrated into a single integrated circuit.

10. The power supply apparatus as defined in claim 8, wherein said reference voltage generator, said voltage divider, said error amplifier, and said output control transistor are integrated into a single integrated circuit.

11. A power supply apparatus, comprising:
- input terminal means for having an input voltage applied thereto from a direct current power source;
- output voltage generating means for generating a constant output voltage based on said input voltage;
- output terminal means for outputting said constant output voltage;
- reference voltage generating means for generating a reference voltage;
- voltage dividing means for receiving said constant output voltage from said output terminal means and for dividing said constant output voltage into a divided voltage in accordance with a voltage dividing ratio which is variable in response to an externally-input control signal and for outputting said divided voltage, wherein said voltage dividing means comprises a first resistance circuit including a plurality of resistors connectable in series, and a second resistance circuit connected in series with said first resistance circuit, said second resistance circuit including a plurality of resistors connectable in parallel including at least one switchably controllable resistor; and
- voltage controlling means for controlling said output voltage generating means to regulate said constant output voltage such that said divided voltage from said voltage dividing means is equalized to said reference voltage.

12. The power supply apparatus as defined in claim 11, wherein:
- said first resistance circuit is connected in series between said output terminal means and said output point of said voltage dividing means;
- a first switch circuit configured to make a short circuit in at least one of said plurality of resistors included in said first resistance circuit in response to an input control signal;
- a second switch circuit configured to connect at least one of said plurality of resistors included in said second resistance circuit between said output point of said voltage dividing means and a common ground of said direct current power source in response to said input control signal; and
- a switch control circuit configured to generate said input control signal in response to said externally-input control signal and to control said first and second switch circuits with said input control signal to change the voltage dividing ratio.

13. The power supply apparatus as defined in claim 11, wherein said voltage dividing means further comprises:
- a first switch circuit configured to connect in parallel with at least one of said plurality of resistors included in said second resistance circuit between said output terminal and said output point of said voltage dividing means in response to an input control signal; and wherein
- said first resistance circuit is connected in series between said output point of said voltage dividing means and a common ground of said direct current power source;
- a second switch circuit configured to make a short circuit in at least one of said plurality of resistors included in said first resistance circuit in response to said input control signal; and
- a switch control circuit configured to generate said input control signal in response to said externally-input control signal and to control said first and second switch circuits with said input control signal to change the voltage dividing ratio.

14. The power supply apparatus as defined in claim 11, wherein said output voltage generating means includes switching means for performing a switching operation for outputting the input voltage applied by the direct current power source in accordance with a control signal from said voltage controlling means, and said voltage controlling means comprises:
    error amplifying means for amplifying an error of said divided voltage output from said output point of said voltage dividing means relative to said reference voltage;
    controlling means for generating said control signal in accordance with an output signal from said error amplifying means to control said switching operation of said switching means; and
    smoothing means for smoothing an output signal from said switching means and to output said output signal to said output terminal means.

15. The power supply apparatus as defined in claim 14, wherein said reference voltage generating means, said voltage dividing means, said error amplifying means, and said controlling means are integrated into a single integrated circuit.

16. The power supply apparatus as defined in claim 14, wherein said reference voltage generating means, said switching means, said voltage dividing means, said error amplifying means, and said controlling means are integrated into a single integrated circuit.

17. A power supply apparatus, comprising:
    input terminal means for having an input voltage applied thereto from a direct current power source;
    output voltage generating means for generating a constant output voltage based on said input voltage;
    output terminal means for outputting said constant output voltage;
    reference voltage generating means for generating a reference voltage;
    voltage dividing means for receiving said constant output voltage from said output terminal means and for dividing said constant output voltage into a divided voltage in accordance with a voltage dividing ratio which is variable in response to an externally-input control signal and for outputting said divided voltage; and
    voltage controlling means for controlling said output voltage generating means to regulate said constant output voltage such that said divided voltage from said voltage dividing means is equalized to said reference voltage;
    said output voltage generating means includes switching means for performing a switching operation for outputting the input voltage applied by the direct current power source in accordance with a control signal from said voltage controlling means, and said voltage controlling means comprises:
        error amplifying means for amplifying an error of said divided voltage output from said output point of said voltage dividing means relative to said reference voltage,
        controlling means for generating said control signal in accordance with an output signal from said error amplifying means to control said switching operation of said switching means, and
        smoothing means for smoothing an output signal from said switching means and to output said output signal to said output terminal means;
    said reference voltage generating means, said voltage dividing means, said error amplifying means, and said controlling means are integrated into a single integrated circuit;
    said reference voltage generating means, said switching means, said voltage dividing means, said error amplifying means, and said controlling means are integrated into a single integrated circuit; and
    wherein said smoothing means includes a transistor which is operated and controlled by said controlling means to function as a flywheel diode, and said transistor, said switching means, said voltage dividing means, said smoothing means, said error amplifying means, and said controlling means are integrated into a single integrated circuit.

18. The power supply apparatus as defined in claim 11, wherein said output voltage generating means includes an output control transistor controlling an output of a current applied by the direct current power source in accordance with a control signal from said voltage controlling means, and said voltage controlling means comprises error amplifying means for controlling an operation of said output control transistor such that said divided voltage of said voltage dividing means is equalized to said reference voltage.

19. The power supply apparatus as defined in claim 18, wherein said reference voltage generating means, said voltage dividing means, and said error amplifying means are integrated into a single integrated circuit.

20. The power supply apparatus as defined in claim 18, wherein said reference voltage generating means, said voltage dividing means, said error amplifying means, and said output control transistor are integrated into a single integrated circuit.

21. A power supply apparatus, comprising:
    an input voltage from a direct current power source applied to an input terminal;
    a reference voltage generator for generating a reference voltage;
    an output control transistor for outputting a constant output voltage to an output terminal in accordance with a voltage input to a gate of said output control transistor; and
    a voltage divider having an output point, said voltage divider configured to accept said constant output voltage from said output terminal of said output voltage generator and further configured to divide said constant output voltage into a divided voltage in accordance with a voltage dividing ratio which is variable in response to an external-input control signal and output said divided voltage to said output point of said voltage divider, wherein said voltage divider comprises a first resistance circuit including a plurality of resistors connectable in series, and a second resistance circuit connected in series with said first resistance circuit, said second resistance circuit including a plurality of resistors connectable in parallel including at least one switchably controllable resistor.

22. The power supply apparatus as defined in claim 21, further comprising an error amplifier amplifying an error between said divided voltage output from said output point of said voltage divider and said reference voltage.

23. The power supply apparatus as defined in claim 21, further comprising a capacitor for stabilizing said constant output voltage through said output terminal, said capacitor coupled to ground and further coupled to said constant output voltage via said output control transistor.

24. A method of operating a power supply apparatus comprising:

applying an input voltage from a direct current power source;

outputting a constant output voltage based on said input voltage;

generating a reference voltage;

dividing said constant output voltage in accordance with a voltage dividing ratio in response to an external-input control signal to produce a divided voltage, wherein said voltage dividing ratio is obtained using a first resistance circuit including a plurality of resistors connectable in series, and a second resistance circuit connected in series with said first resistance circuit, said second resistance circuit including a plurality of resistors connectable in parallel including at least one switchably controllable resistor; and regulating said constant output voltage such that said divided voltage is equalized to said reference voltage.

25. The method as defined in claim 24, further comprising:

amplifying an error between said divided voltage and said reference voltage; and generating a control signal based on said amplified error, said control signal controlling said act of regulating.

26. The method as defined in claim 25, further comprising smoothing said regulated constant output voltage.

* * * * *